United States Patent [19]

Josefiak et al.

[11] Patent Number: 4,666,607
[45] Date of Patent: May 19, 1987

[54] POROUS SHAPED BODIES, AND METHOD AND APPARATUS FOR THE PRODUCTION THEREOF

[75] Inventors: Christoph Josefiak, Erlenbach; Friedrich Wechs, Wörth, both of Fed. Rep. of Germany

[73] Assignee: AKZO NV, Arnhem, Netherlands

[21] Appl. No.: 633,573

[22] Filed: Jul. 23, 1984

[30] Foreign Application Priority Data

Jul. 30, 1983 [DE] Fed. Rep. of Germany ....... 3327638
Aug. 16, 1983 [DE] Fed. Rep. of Germany ....... 3329578

[51] Int. Cl.$^4$ .................... C08J 9/28; B01D 13/00; B01D 13/01; B01D 13/04
[52] U.S. Cl. ................... 210/640; 210/500.23; 210/651; 264/41; 264/178 R; 425/67; 425/817 C
[58] Field of Search .............. 264/41, 49, 178 R; 210/640, 651, 500.23; 425/67, 817 C

[56] References Cited

U.S. PATENT DOCUMENTS

| | | | |
|---|---|---|---|
| 3,933,653 | 1/1976 | Hashino et al. | 264/41 X |
| 3,950,257 | 4/1976 | Ishii et al. | 264/41 X |
| 3,988,245 | 10/1976 | Wang | 264/41 X |
| 4,175,153 | 11/1979 | Dobo et al. | 264/41 X |
| 4,247,498 | 1/1981 | Castro | 264/49 X |

FOREIGN PATENT DOCUMENTS

| | | |
|---|---|---|
| 2833493 | 2/1980 | Fed. Rep. of Germany . |
| 3205289 | 2/1982 | Fed. Rep. of Germany . |
| 2026381 | 2/1980 | United Kingdom . |
| 1576228 | 10/1980 | United Kingdom . |
| 2115425 | 9/1983 | United Kingdom . |

OTHER PUBLICATIONS

*The Random House College Dictionary* Revised Edition, New York, Random House, Inc., ©1982, p. 196.
*The American Heritage Dictionary* Second College Edition, Boston, Mass., Houghton Mifflin Company, ©1982, p. 233.

Primary Examiner—Philip Anderson
Attorney, Agent, or Firm—Michael J. Striker

[57] ABSTRACT

Porous shaped bodies are disclosed, and an apparatus and method of their production by extruding a homogeneous, single-phase liquid mixture of polymer and mixing partner liquid at the temperature of mixture preparation through a nozzle downwardly with a linear velocity $v_1$ into a cooling liquid that dissolves the polymer insubstantially or not at all at the cooling temperature, the cooling liquid being provided from entry of the extruded mixture until at least the point of start of solidification thereof in a substantially vertically arranged tubular zone surrounded by a wall, velocity $v_2$ of cooling liquid in this zone being less than $v_1$. The cooling liquid is preferably contained in a U-shaped tube and its level is controllable by dosing at entry and/or exit points.

50 Claims, 2 Drawing Figures

POROUS SHAPED BODIES, AND METHOD AND APPARATUS FOR THE PRODUCTION THEREOF

BACKGROUND OF THE INVENTION

The invention concerns shaped bodies having pores, such as fibers, membranes in the form of hollow filaments, flat foils, tube foils and the like, a process for the production thereof, as well as an apparatus for performing the production process.

Membranes which can be employed for separation processes in various areas of use, for example, in the fields of medicine, pharmacy, foods chemistry, and also in technical areas, as well as processes for their production, have already been known for many years. The membranes are prepared from polymers such as regenerated cellulose, cellulose derivatives, and even from synthetic polymers such as polypropylene, polyesters, polyamides, polyurethanes, polycarbonates, halogenated polyolefins and the like. Depending upon the production conditions, the employed polymer and its characteristics, the membranes are suitable for osmosis and reverse osmosis, dialysis, ultrafiltration, microfiltration or for various other purposes. The factors that are critical for the suitability of a membrane with regard to the particular areas of use include its perviousness or permeability, its retention limit, as well as the selectivity. Moreover, characteristics such as mechanical strength, durability with regard to the medium of treatment, and hydrophilicity or hydrophobicity with regard to the treatment medium, among others, obviously play a role in this respect. It is additionally important that a membrane be capable of being left in use for as long as possible a time period during a separation operation without its becoming obstructed or having its characteristics alter during its employment to such an extent that the permeability and the selectivity no longer remain the same.

Of greatest significance insofar as the production of the membranes is concerned is that one be able to controllably regulate determined characteristics such as perviousness and selectivity, and to succeed in reproducibly obtaining these constant characteristics. Particularly in the field of medicine, nothing is namely worse than when the characterisitics of membranes fluctuate from one lot to another.

For many areas of employment, in particular for the treatment of water-containing mixtures not only in medical and pharmaceutical, but also in technical areas, it is advantageous to employ membranes which possess a certain hydrophilicity, such as e.g. membranes based upon polyamides. In other cases, it is considered valuable for the membranes to be very chemically resistant. Thus, for example, polyvinylidenefluoride (PVDF) represents a polymer which is durable even when employed with strongly acid and strongly alkaline aqueous solutions and against oxidizing media. Membranes of PVDF should thus also be employable mainly for processes for which other polymers, on account of their chemical nature, are less suitable or even completely unsuitable. The above mentioned characteristics of membranes such as permeability and selectivity also depend upon the pore structure of the membranes.

Membranes which display pores are generally prepared by means of working up of a polymer solution, for example by spreading out the polymer solution on a smooth support into a film and then allowing the solvent to evaporate, or by treatment with a liquid which does not dissolve the polymer but does dissolve the solvent, manufacturing the membrane structure by means of coagulation. In order to obtain pore structures as uniform as possible, coagulation techniques are not, however, particularly suitable. Even with the methods of production for membranes wherein the solvent is evaporated, there occurs a formation of a certain asymmetry within the membrane. Frequently even a so-called skin forms, which impairs the perviousness of the membrane.

In more recent times, processes for the production of membranes have been developed with which neither a coagulation by means of wet precipitation occurs, nor is the solvent evaporated from the solution by means of heating. Thus, for example, in DE-OS No. 28 33 493 a process is described for the production of porous hollow fibers employable as membranes, with which a homogeneous, single-phase mixture of a meltable polymer and a liquid inert with respect to the polymer, whereby the polymer and the inert liquid form a binary system which in a liquid aggregate state displays a range of complete miscibility and a range with a miscibility gap, is extruded at a temperature above the separation temperature into a bath composed completely or predominantly of the inert liquid which is also provided in the extruded mixture, the bath possessing a temperature below the separation temperature. By means of cooling, the formed hollow fiber structure is solidified. In order to obtain free, void pores, the inert liquid is removed after the solidification, preferably by means of extraction. It is possible with this technique to obtain membranes with an extensively isotropic structure in their interiors, and which in other respects possess a surface that is very smooth despite a high degree of openings.

Whether or not one can manufacture good membranes in outstanding manner with this technique, there occur difficulties if it is desired to work up mixtures the viscosity of which is either low, based upon their small concentration, or which contain polymer that, based upon its low molecular weight, leads to mixtures with low viscosity.

It has so turned out that even with these techniques certain difficulties can still occur when porous shaped bodies are supposed to be prepared from polymer compositions which are sensitive to mechanical stress during their working up. This susceptibility in the presence of mechanical stress is present in particular measure with low viscous polymer mixtures.

Even according to the more favorable techniques, with which a mixture of a homogenous liquid polymer composition upon cooling down runs first into a liquid two-phase area and then solidifies still above room temperature, it is difficult to work up these mixtures into shaped bodies having pores if the viscosity of the mixture to be worked up lies, before its extrusion through a nozzle, below a determined range, namely below about 15 Pa.s. On the other hand, it is frequently desirable to work with relatively low viscous mixtures in order to obtain specific development of the pore system.

It has also been proven that irregularities can occur during the production of the membrane when one works with a bath which is located in a customary tank. All movements such as wave motion, as well as changes in the bath with regard to concentration, temperature and so forth, influence the membrane formation and lead to membranes with differing characteristics. It is also difficult to so rotate such a bath that constant temperature and composition are guaranteed at the entry place of the extruded mixture.

A series of disadvantages occur also upon working with a spinning tube, such as described in DE-OS No. 28 33 493. Thus, for example, strong shear forces act on the forming membranes. Moreover, the process parameters in the spinning tube under which operation can be well performed, are strongly limited. This process thus allows working only within a relatively narrow viscosity and temperature range of the cooling medium, thereby limiting control of the pore size and pore structure. The above mentioned strong shear forces act particularly to disadvantage with low viscous polymer/liquid mixtures.

The manufacture of pore-displaying shaped bodies in the form of fibers is likewise complicated, and many disadvantages which occur with processes for the production of membranes also occur in this case. It is thus also difficult to obtain controllably determined pore structures. Another problem which concerns the production of such fibers is that, particularly for areas of use such as controlled delivery of active substances, specific adsorption and the like, fibers with precisely adjustable pore structures are required.

Accordingly, there still exists a need for an improved process for the production of pore-displaying shaped bodies, in particular the production of membranes with good permeabilities and selectivities.

SUMMARY OF THE INVENTION

It is therefore an object according to the present invention to make available such porous shaped bodies, in particular membranes, and a process for the production thereof, with which the different process parameters can be varied within broad limits, which is less susceptible to disturbances, and which allows in particular the working up of low viscous mixtures.

It is a further object according to the present invention to make available porous shaped bodies of this type and a process for their production with which constant characteristics such as, for example, porosity, can be reproducibly adjusted, and with which one can arrive at shaped bodies in advantageous manner from the most different types of polymers.

This object is obtained according to the present invention by a process for the production of porous shaped bodies by means of extrusion of a homogeneous, single-phase, liquid mixture of one or more polymers and one or more mixing partners liquid at the temperature of production of the mixture, whereby the mixture displays above room temperature in a liquid state a range of complete miscibility and a range with a miscibility gap, and possesses above room temperature a solidification range, into a cooling arrangement containing a cooling liquid, and withdrawing the formed shaped body from the cooling liquid, which is thereby characterized in that the polymer/mixing partner-mixture is led at a temperature above the miscibility gap with an average linear velocity $v_1$ through a nozzle downwardly into a cooling liquid which at the cooling temperature dissolves polymer insubstantially or not at all and which possesses a temperature below the solidification point, and the extruded mixture is then led from the entry point into the cooling liquid at least until the place at which solidification starts through a substantially vertically arranged tubular zone surrounded by a wall and the shaped body after the start of solidification of the polymer is guided around in this substantially vertically arranged tubular zone in which the average velocity $v_2$ of the cooling liquid, measured in the direction of movement of the polymer/mixing partner-mixture, is held less than $v_1$, after which it is led upwardly through a second zone, withdrawn from the cooling liquid, the level of the cooling liquid being held constant not only at the entry point of the mixture into the cooling liquid but also at the exit point of the shaped body from the cooling liquid.

The polymer/mixing partner-mixture employed for production of the porous shaped bodies, which is extruded as a single-phase, homogenous, liquid mixture, is prepared from one or more polymers and one or more mixing partners. At least one of the mixing partners must be a solvent for the polymer at the temperature of preparation of the mixture, so that a single-phase, liquid mixture is obtained. The mixture components, i.e. the polymer or polymers and the mixing partner, must be so selected according to type and amount, that the mixture displays in a liquid state a range of complete miscibility and a range with a miscibility gap, so that the mixture, upon cooling down, first runs through a temperature range in which two liquid phases occur side-by-side as a result of de-mixing within the liquid state, and solidifies first thereafter with formation of a solid shaped body. One of the two phases formed after the de-mixing represents a polymer-poor liquid phase of the mixing partners, the other a mixing partner-poor, polymer-enriched liquid phase. The latter leads to porous shaped bodies upon further cooling down by means of solidification. Not only the temperature, at which the de-mixing into two liquid phases occurs, but also the solidification temperature, must lie above room temperature in order to guarantee obtaining the shaped body without additional operational steps such as cooling to below room temperature or extraction of the solvent. Preferably, the solidification temperature of the polymer or polymers in the employed/mixing partner-mixture lies above 50° C. It is possible to employ, in addition to the solvent, still other mixture components such as non-solvent, pigment, thickening agent and surfactant, insofar as the above mentioned conditions are maintained. As a rule, advantages result with specific addition of a non-solvent, thus a mixture partner, in which the polymer or polymers are not soluble. The addition of a non-solvent effects in general no alteration in the solidification temperature with the previously described systems, however it acts to elevate the de-mixing temperature, indeed according to type and amount of the non-solvent. In so doing one is able to increase the temperature range in which two liquid phases are present side-by-side, and thereby the latitude for a determined variation of the pore system. Moreover, this addition of non-solvent in chosen type and amount results in greater latitude with regard to the type and amount of solvent. The choice of many solvents either according to type or amount, without the addition of non-solvent, is thus namely excluded, since mixtures containing only these solvents are not capable of forming liquid two-phase systems.

The mixing partner or partners must be inert with respect to the polymer or polymers at the process temperature, i.e. the polymer cannot be chemically altered by the mixing partner.

An employment of thickening means is favored particularly with the working up of polyamide. Generally, thickening agent can be employed in concentrations up to about 1% by weight, preferably from 0.05 up 0.3% by weight relative to the co-employed mixing partner, that is the solvent and non-solvent.

It is self-evident that additions such as silicic acid or strengthening fibers do not themselves dissolve into the mixture, and the homogeneous and single-phase characteristics refer only to the main components of the mixture, namely polymer and mixing partner.

The process according to the present invention is particularly suitable for the production of porous shaped bodies of polymers with hydrophilic charateristics. Such characteristics are desirable mainly with the treatment of water-containing mixtures. As areas of employment for which the shaped bodies according to the present invention can be employed in particularly favorable manner, mention may be made among others of the medical field, e.g. for the sterile filtration of water. Practically endless employment possibilities are offered in technology, e.g. in the fields of food stuff chemistry, such as for the filtration of beverages and the like.

Polymers suitable for such a hydrophilic purpose of use include polyurethane, in particular though polyamide and copolyamide. Most preferred are polyamide 6 and copolyamide based upon E-caprolactam and hexamethylenediamine/adipic acid, e.g. a copolyamide based upon 80% E-caprolactam and 20% hexamethylenediamine/adipic acid salt. Also very suitable are mixtures of homopolyamides and mixtures of homopolyamides and copolyamides as well as mixtures of copolyamides. Interesting characteristics can be adjusted by means of blending these homopolymers and copolymers.

Another polymer from which advantageous pore-displaying shaped bodies can be prepared according to the present invention is polyvinylidine fluoride (PVDF). The PVDF employed for preparation of the mixture can be of typical commercial quality. The molecular weight must, however, be at least so high that the polymer is capable of fiber formation. An example of such a suitable polymer is e.g. Solef 1012 (manufacturer: Fa. Solvay, Brussels).

In principle all substances which provide a mixture fulfilling the requirements mentioned above are suitable as solvent for preparation of the mixture. However, it is particularly preferred to employ substances that are liquid at room temperature and have low toxicity, and which possess a boiling point clearly above the demixing temperature of the polymer mixture prepared therewith.

Particularly suitable as solvent for polyamide in accordance with the present invention are ethyleneglycol, diethyleneglycol, triethyleneglycol, glycerin, E-caprolactam, glycerinmonoacetate, mixtures of ethyleneglycol and glycerin among others.

In the case of PVDF as polymer, the following solvents have proven to be particularly advantageous: glycerin-triacetate, glycerindiacetate, 2-(2-butoxyethoxy-)-ethylacetate or mixtures thereof. The glycerindiacetate can involve the 1,2- or the 1,3- isomer or a mixture of both.

Glycerin can serve as non-solvent or as swelling agent for the mentioned polyamide, when already another solvent, better acting at lower temperature, is provided, so that glycerin acts as a non-solvent. In this connection also polyethyleneglycol and triacetin may be mentioned.

For the case in which preparation is performed with an addition of a non-solvent, and with employment of PVDF as polymer, an optional substance or an optional substance mixture can be chosen as non-solvent to the extent that the prerequisites mentioned above are fulfilled. Particularly advantageous non-solvents, specifically in connection with the mentioned preferred solvents for PVDF, include di-n-octyladipate and castor oil or mixtures thereof.

It is thus advantageous when, for example, polyamide 6 is employed as polymer and ethyleneglycol and glycerin are selected as mixing partners, with co-employment of thickening means, preferably in concentrations from 0.05 up to 0.3% by weight, relative to the mixing partner (solvent and, if necessary, non-solvent). Suitable thickening means include, for example, Carbopol 934 of the firm of Goodrich (high-molecular carboxyvinylpolymer), Keltrol F (firm of Kelco in New Jersey, USA), Sedipur TF7 (BASF).

Production of the single-phase mixture can basically follow by means of mixing and heating of components to a temperature at which a homogeneous mixture forms. If the polymer and the mixing partner are mutually inert also at very high temperatures, then they can dissolve at relatively high temperatures, e.g. above the melting temperature of the polymer; this applies e.g. for the mixture polyamide 6 and E-caprlactam/triacetin. When polymer and mixing partner are not mutually inert at higher temperatures, such as is the case e.g. with polyamide 6 and ethyleneglycol/glycerin, where at higher temperatures a polymer degradation occurs, the same applying also for polyamide 6-ethyleneglycol/-polyethyleneglycol-mixtures, the temperature for the preparation of the mixture should be as low as possible, and also the dwell time for the mixing should be as short as possible. This can be attained, e.g. by melting the polyamide at its melting temperature and heating the mixing partner to a lower temperature, followed by intermixing the polyamide and the mixing partner with one another. The temperature adjusted thereby for the mixture lies clearly below the melting point of the polymer, but must, however, lie above the temperature of the miscibility gap.

It is also possible, for example, to pre-mix the pulverized polyamide with the mixing partner at room temperature and then to heat to a temperature above the demixing temperature.

Not only the mixing with the first technique, but also the heating above the miscibility gap with the second technique occur preferably continuously and with brief dwell times, i.e. the mixture is also further worked up after the mixing without delay, that is it is deformed into the shaped bodies.

Further polymers are mentioned in DE-OS No. 27 37 745, the disclosure of which is hereby incorporated by reference. The DE-OS also discloses suitable liquids which can be worked up in combination with the corresponding polymers into single-phase liquid mixtures.

Favorable polymer/mixing partner-mixtures with several mixing partners are described in German patent application No. 32 05 289 filed Feb. 15, 1982. Suitable cooling liquids are also mentioned in this reference, the disclosure of which is hereby incorporated by reference.

The homogeneous, liquid single-phase mixture of one or more polymers and one or more mixing partners is led through a nozzle for further working up according to known techniques, and then enters a cooling arrangement which contains a cooling liquid. The nozzle is formed according to the desired shape of the product shaped body, for example as hollow fiber nozzle or as slit nozzle, or even as nozzle for the production of tubing.

In order to hold the mechanical stresses on the mixture as low as possible before the point in time of the start of solidification, it can be advantageous particularly in the case of production of hollow fibers not to form the interior spaces by means of a dosaging, as is customary, of a gas, but by means of a lumen-filling liquid. The dosaging of the lumen-filling liquid can take place in the nozzle or at the point at which the mixture exits from the nozzle. For employment as a lumen-filling liquid, a liquid must be selected which does not dissolve the polymer or polymers at the temperature of conveyance through the nozzle. Specifically when PVDF is chosen as polymer, an employment of glycerin as lumen-filling liquid is advantageous, or a liquid (e.g. non-solvent), which was employed for production of the polymer-mixing partner-mixture. The advantage of working with a lumen-filling liquid instead of the frequently employed gas is that a liquid, on account of its low coefficient of heat expansion experiences less volume work upon subsequent cooling down and thereby leads to increased shape stability of the polymer shaped body during its formation. A further advantage of employing a liquid instead of a gas is that the specific weight of the mixture leaving the nozzle can be adjusted selectively within broader limits. It is thereby possible to selectively vary the velocity of the mixture from the nozzle up to its entry into the cooling liquid, and even up to the point of the start of solidification. In the event that the interior volume is obtained by means of a gas, nitrogen is preferred.

The process according to the present invention is very suitable for the extrusion of polymer/mixing partner-mixtures with a viscosity from 2 up to 25 Pa.s. One can, however, also work with mixtures of higher viscosity. The recited values involve viscosities which are displayed by the mixtures at such temperatures at which they are led through the nozzle. For the case when polyvinylidene fluoride is selected as polymer, the viscosity of the mixture should amount to preferably between 5 and 35 Pa.s.

Advantageously, polymer-mixing partner-mixtures with 10 up to 90% by weight polymer are employed, whereby the specifically optimal content of polymer depends upon the nature thereof and the nature of the mixing partner. It is thus advantageous in determined instances to work with mixtures in which the polymer content amounts to only 10–25% by weight.

The process according to the present invention permits a working up of even low viscous mixtures, as mentioned above. This possibility is of particular significance for the preparation of pore-containing shaped bodies of polyamide or of polyvinylidene fluoride (PVDF), since single-phase, liquid mixtures which contain these polymers frequently display lower viscosities at the temperature of promotion through the nozzle than solutions of other polymers, such as for example high polymer polypropylene. The greater latitude with regard to viscosity provided by means of the process according to the present invention, compared to known techniques, leads to a greater latitude with respect to the composition of mixtures insofar as polymer concentration, type and amount of solvent and, if necessary, other mixture components.

This increased latitude leads, moreover, to more possibilities with regard to the development of the pore systems. It is also possible to employ for preparation of membranes polymers with lower molecular weight than was previously the case. It is thereby possible to selectively influence in particular even the mechanical characteristics of the membranes.

With the process according to the present invention even very low concentrated polypropylene mixtures can be worked up, for example those with 15% by weight or less polypropylene, which leads to difficulties when attempted with other known techniques.

The polymer/mixing partner-mixture leaving the nozzle enters a cooling arrangement which is filled with a cooling liquid. An air slit or gap can be located between the nozzle and the entry point of the mixture into the cooling liquid. In so doing the necessary temperature constancy at the nozzle is more easily realized than in the case when the nozzle remains in contact with the colder cooling liquid. It is advantageous as a rule to employ such an air gap, which can amount to between e.g. 2 and 20 mm.

It can be particularly favorable to climatize the air gap i.e. to hold it at a determined temperature by means of heating, or to provide the air gap, which can contain gas, e.g. air, with a determined composition, such as for example by means of adjusting a determined relative moisture or by means of adjusting a determined concentration of solvent vapor.

Since it is essential for the process to hold the mechanical stress on the mixture as low as possible at least up until the point in time of the start of solidification, the nozzle is brought perpendicular or nearly perpendicular with respect to the entry point of the mixture into the cooling liquid, so that the mixture, after exiting from the nozzle, can enter into the cooling liquid freely without additional forces derived from the perpendicular path. Cooling down of the mixture and solidification with formation of the porous shaped body occurs in the cooling arrangement. For this purpose the arrangement is filled with a cooling liquid.

According to a particularly advantageous embodiment of the process according to the present invention the cooling liquid is located in a U-shaped curved tube. Cooling liquid can be continuously dosed into the cooling arrangement during the process, whereby the direction in which it streams through the arrangement can be equidirectional or opposite to the direction of movement of the polymer/mixing partner-mixture respectively the formed shaped body. For this case of a continuous dosing the dosed liquid possesses a constant temperature which lies below the solidification temperature of the mixture. The entry point for the cooling liquid into the arrangement is located in the case of parallel movement next to the entry point of the mixture into the cooling liquid. At the exit point of the formed shaped body is located in this case an overflow arrangement at which the cooling liquid leaves the arrangement. For the case of opposite direction of movement, entry and exit points for the cooling liquid are correspondingly transposed. It is particularly advantageous to dose the cooling liquid from positions around the entry point of the mixture by means of multiple openings. These openings are expediently disposed symmetrically about the entry point of the mixture. It is very favorable to dose the cooling liqud about the entry point of the mixture in the form of a coherent film.

It is possible to control the level of the cooling liquid at the entry point of the mixture and also at the exit point of the shaped body either only at one place or also at both places by means of an overflow vessel.

One can, however, also operate under stationary conditions, i.e. with no continuous dosing of cooling liquid, but only with compensation for the loss that occurs by means of cooling liquid being picked up by the formed shaped body. Herewith too the cooling liquid must naturally display in the arrangement a temperature below the solidification temperature of the mixture. In this case it is expendient in order to maintain constant temperature conditions in the arrangement to undertake an external thermostatization of the arrangement. The necessary maintenance of constant temperature conditions follows thus depending upon the process variation either by means of the streaming cooling liquid or through external thermostatization or both together, or by means of a temperature equilibrium adjusting during the process. In the case of large dimension cooling arrangements it is recommended to provide an external thermostatization. Under constant temperature conditions it does not go without saying in this connection that the temperature of the cooling liquid possesses the same value at each location in the arrangement—which is indeed not possible on account of the supply of polymer mixture of higher temperature—but that at each location in the arrangement the there prevailing temperature changes only insignificantly or not at all during the process. There can this be provided a temperature gradient across the length of the arrangement.

It is of more essential significance for the invention that the polymer mixture, at least until the time point of the start of solidification, i.e. up to the time point of the start of shape stabilization, be subjected to the smallest possible mechanical stress. It is thus necessary to be concerned that the mixture undergoes no acceleration through the cooling liquid—this applies for the case of the same direction of movement of mixture and cooling liquid—as well as no too strong slowing down—this applies for opposite direction of movement. Accordingly, the average velocity $v_2$, measured in the direction of movement of the polymer mixture, with which the cooling liquid streams through the arrangment, at least in the zone between entry point of the mixture into the cooling liquid and its start of solidification, must be lower than the velocity $v_1$ with which the mixture exits from the nozzle. The zone between the entry point of the mixture into the cooling liquid and the point of the start of solidification of the mixture is arranged substantially vertically tubular and runs around a wall.

It is advantageous for the cooling liquid to be led through the substantially vertically arranged tubular zone with an average linear velocity $v_2$ which is at least about 20% less than $v_1$. In certain cases, however, it is advantageous for the velocity $v_2$ of the cooling liquid to be about at least 25% less than the velocity $v_1$ with which the polymer/mixing partner-mixture is advanced through the nozzle. This is even necessary for the production of porous shaped bodies from polyvinylidene fluoride (PVDF).

The average linear velocity $v_2$ of the cooling liquid in the substantially vertically arranged tubular zone can also be held equal to zero. In such a case it is recommended to replenish by means of dosing in only that amount of cooling liquid which is carried along by the shaped body when it leaves the cooling liquid. In this case the cooling liquid can be dosed in not only at the entry point but also at the exit point, carefully and mainly in small amounts.

It is particularly expedient in this case for the temperatures in the cooling arrangement to be held constant by means of external thermostatization.

According to one particular embodiment of the process according to the invention the cooling liquid is led through the substantially vertically arranged tubular zone opposite to the direction of movement of the polymer/mixing partner-mixture. That is, the cooling liquid is dosed in at the place where the shaped body leaves the liquid. It is expedient to hold the liquid level of the cooling liquid at the exit point for the formed shaped body to the same level as at the entry point of the polymer/mixing partner mixture into the cooling liquid.

For the case in which the cooling liquid streams through the arrangement opposite to the direction of movement of the mixture, the velocity of the cooling liquid naturally always lies at least 25% lower than $v_1$, since the velocity of the cooling liquid in this case has a negative sense. Thereby a broader scope is provided for the velocity of the cooling liquid. This is, on the one hand, for the same direction of movement, limited by the above given requirement that it must be less, preferably at least 20 or 25% less, than the velocity of the polymer mixture. For the case of opposite direction of movement, this velocity naturally cannot assume optionally high values. On the contrary, there occurs a limit at which too high a relative velocity is reached between polymer mixture and cooling liquid. This limiting value depends upon specific process parameters and is easy to dtermine by means of slight experimentation. The velocity for the case of opposite direction of movement reaches its limit when deformation or ruptures of the still not stabilized polymer mixture occur. A rule of thumb for the limit of the velocity of the cooling liquid in the case of opposite direction of movement is a value from about $5 \cdot ^4\sqrt{v_1}$, whereby $v_1$ signifies the velocity of the polymer mixture in m/min at the nozzle exit. If in the case of the same direction of movement one were to adjust the average velocity of the cooling liquid to the same value which the mixture displays upon exit from the nozzle, then on account of the velocity distribution in the flowing liquids, the cooling liquid would have a higher value than the nozzle exit velocity in the direct vicinity of the mixture, and would accelerate the mixture.

The velocity of the cooling liquid, which is of decisive importance in the zone between entry point of the polymer mixture into the cooling liquid and the point of the start of solidification of the mixture, must thus be controlled. This is made possible in that one can hold the level of the cooling liquid constant not only at the entry point of the polymer mixture into the cooling liquid but also at the exit point. For this reason one locates an overflow arrangement at the exit point. In addition to such apparatus measures, the control of the velocity can follow by means of corresponding dosaging of cooling liquid. In the case of a stationarybath, i.e. in the case where the velocity of the cooling liquid has a null value, naturally the dosing signifies only the compensation of losses. In the normal case the level of the cooling liquid at the entry and at the exit points is not only held constant, but the level is also of equal height at both places. One can, however, also provide a height differential as between both place.

A particular advantage of the process according to the present invention in addition to the possibility of working up low viscous polymer mixtures is that, on account of the constant level of the cooling liquid and the low velocity of flow of the cooling liquid, a broader range is provided for viscosity and temperature of the cooling liquid and thereby the type of cooling liquid. With the known techniques this range is substantially more limited on account of the mechanical stresses on the still not stabilized polymer mixture.

It is essential for the invention that the polymer/mixing partner-mixture be mechanically stressed as little as possible between the point in time when it leaves the nozzle and the point in time of the start of solidification, be it through shear force or through traction. In particular, the mixture within this zone cannot be strongly mechanically influenced by means of the cooling liquid, such as e.g. by means of acceleration. In addition to the above mentioned control of the velocity of the cooling liquid, this is realized by leading the mixture downwardly in a first zone which extends from the entry point of the mixture into the cooling liquid up until the point of the start of solidification. This zone represents a relatively narrow tubular zone defined by walls, e.g. in the form of a cylindrical tube, the diameter of which is clearly lower than its length. The place of the start of soldification of the mixture, up until which the mechanical stress must stay as low as possible, can be determined in an simple manner. This is done by means of observation of the changes which the mixture undergoes after its exit from the nozzle. First occurs a demixing into two liquid phases as a result of cooling down. A formation of the two phases precedes a rise in viscosity. A turbidity of the mixture starts with the formation of the two phases, and which is increased up to the start of solidification. Since the solidification begins at the outer layers and then first advances inwardly, the optically perceptible turbidity increases only between the point in time of the demixing up to the start of solidification, and then changes no more. The point of the start of solidification is thus that point at which increase in the turbidity is no longer determinable. It can easily and fairly precisely be determined.

It is first after the point of the start of solidification that the forming shaped body possesses a certain stability which permits somewhat stronger mechanical stress. Accordingly, the guide arrangement is first located after this point.

It is not, however, necessary that it be situated directly after this point. After the deflection the partially or completely formed solid shaped body runs through a second zone of the cooling liquid in which it is led upwardly. Deflection and upward advancement are necessary in order to be able to employ an arrangement in which the cooling liquid can be held to constant liquid levels not only at the entry point but also at the exit point. This second zone, in which the shaped body is advanced upwardly does not have to be substantially vertically arranged tubular as is the first zone, but can be a zone with broader dimensions, e.g. in the form of a tank, as is shown in FIG. 2. It cannot, however, coincide with the first zone, i.e. the shaped body cannot be led upwardly into the substantially vertically arranged tubular first zone between entry point and the point of the start of solidification.

The second zone can, however, also be formed as a substantially vertically arranged tubular zone such as is the case e.g. when a U-shaped bent tube analogous to that shown in FIG. 1 is employed as a apparatus.

The density of the cooling liquid can be higher or lower thah that of the polymer/mixing partner-mixture. However, it as advantageous for the cooling liquid to possess a specific weight slightly lower, i.e. deviating downwardly up to 20% from the specific weight of the polymer/mixing partner-mixture, at the place where it enters into the polymer/mixing partner-mixture. Thus is prevented too quick a sinking of the mixture and too strong a slowing down based upon greater density differences. This slight difference in the specific weight can be obtained, aside from the choice of a determined cooling liquid, by employing as cooling liquid a mixture of determined composition.

Similar effects can then also be obtained by employing for the production of hollow fibers or tubing lumenfilling liquids of different density. In so doing it is possible to realize an extruded mixture which behaves as if it possessed a specific weight lying between its own and that of the lumenfilling liquid.

In principle, any optional liquid can be employed as cooling liquid, in which the polymer does not substantially dissolve at the temperature of the cooling liquid and which effects no chemical changes in the polymer.

In addition to other liquids, water, if necessary containing a surfactant for decreasing the surface tension, has proven to be suitable. Preferable temperatures in connection with such an employment range from 20 up to 80° C.

Withdrawal of the formed shaped body from the cooling liquid can be accomplished according to known techniques, whereby care should be taken that no strong mechanical stress on the mixture between nozzle exit and the start of solidification is occasioned by means of withdrawal. Beyond that it can be advantageous in certain instances to withdraw the shaped body from the cooling liquid at the same velocity which the mixture possesses upon exit from the nozzle.

Whether or not it can be desirable in certain cases not to wash out substances such as solvent and non-solvent confined on the pores of the obtained polymer shaped body, the formed shaped body is normally washed. This can follow by means of an extraction which is annexed continuously to the production of the shaped body or which is formed discontinuously. After the extraction the shaped body is dried.

By means of the described process steps one succeeds in preparing porous shaped bodies, e.g. polymer membranes in the form of hollow fibers, tubing or foils, which distinguish by good shape stability. Moreover, aside from membranes also porous polymer fibers can be prepared according to the present method. One succeeds with these method steps in holding the mechanical loading which occurs on the polymer mixture up to the point in time of the start of solidification, thus the beginning of shape stability, lower than with known techniques. It is thereby made possible to work even with relatively low viscous mixtures to provide polymer shaped bodies, which was only conditionally or not at all possible according to previously known techniques. With the process according to the present invention products of constant and reproducible quality can be obtained, whereas with manufacture according to the previously known techniques, specifically in the case of the working up of low viscous polymer mixtures, uncontrollable fluctuations in quality occur which frequently can lead to too great a mechanical stress on the still not solidified or form stabilized polymer mixtures. The method according to the present invention allows one to reproducibly and selectively adjust the pore size and characteristics by means of variation of the process parameters within broad limits.

By means of the method according to the present invention it is possible to deform into membranes even mixtures with a polymer content of less than 15% by weight without great difficulty, which previously was not possible at all or only with the greatest difficulty since disadvantages with regard to the pore system had to be put up with. It is possible now to work up mixtures with concentrations of 10% by weight polymer and less. With the method according to the present invention essentially all polymers can be worked up which are meltable and for which there exists a mixing partner that forms with the polymer a diagram of state of the type that has been detailed above. Belonging thereto, among others, are polyolefins such as polypropylene, polyethylene, polymethylpentene among others, as well as corresponding copolymers.

By means of the described method, particularly through the low mechanical stress up until the start of solidification, porous polymer shaped bodies are obtained, the shape stability of which is good and which display constantly good quality. Breakage and quality fluctuation such as uncontrollable fault points in the form of pore sizes and pore characteristics deviating from required values are limited to a minimum.

Also within the scope of the present invention are porous shaped bodies such as are obtainable according to the above described techniques.

The obtained shaped bodies display pores on each of their surfaces, i.e. also the interior surfaces of the hollow fibers or tubing display pore openings. Based upon the broad latitude with regard to type and amount of solvent, type and amount of non-solvent, type, amount and throughput of the cooling liquid, as well as the temperature scheme during the entire process, pore size and pore characterisitics of the polymer shaped bodies can be adjusted selectively and reproducibly within broad limits. It is thus possible to obtain average pore sizes from about $0.\mu u$ up to about $\mu u$. The total pore volume can likewise be influenced within broad ranges, e.g. through the weight ratio between polymer and mixing partner, and lies between about 10 and 90 %. Different characteristics of the pore systems can be obtained by means of adjustment of various method parameters. Indeed according to type and amount of solvent as well as if necessary of non-solvent, type, amount and throughput of the cooling liquid, as well as according to the temperature scheme within the cooling arrangement, in priniple two different types of pore structures are obtained, between which transitions are possible:

(a) a pore system with substantially sphere-shaped cavities which are separated from each other by porous intermediate walls. The pores of the intermediate walls display a smaller average diameter than the sphere-shaped cavities.

(b) a three-dimensional network of pores which are separated only by narrow intermediate bridges, not however by intermediate walls.

In addition to both these possibilities, the arrangement of the pore systems can be influenced in yet another manner. Mainly through variations in the viscosity of the polymer mixture and the type and temperature of the cooling liquid either an isotropic or anisotropic pore system is obtained. With an anisotropic pore system, pore size and/or pore structure display gradients in the direction from the surface into the interior of the shaped body. The asymmetry can be obtained e.g. by differing the chemical composition of the lumen liquid and the cooling liquid and/or their temperature upon production of the membranes in the form of hollow fibers or tubing.

The polymer shaped body manufactured according to the present invention has multiple utilities, thus e.g. for the microfiltration of aqueous solutions and of solutions in organic solvents.

For the case that PVDF is employed as polymer, the manufactured PVDF shaped bodies provide further multiple possibilities of use. In many cases PVDF membranes are suitable since they display an extraordinary resistance against oxidative attack, being resistant to an unusually great number of organic solvents. Moreover, their mechanical characteristics first clearly decrease at temperatures within the vicinity of the melting point. In the case of the filtration of aqueous solutions, PVDF membranes can also find use where other polymers, on account of their susceptibility in strongly acid or strongly alkaline pH ranges, cannot be employed, thus e.g. for the filtration of hypochlorite solutions.

The membranes prepared according to the present invention are also suitable for transmembrane distillation. During transmembrane distillation, with which the short diffusion stretch (membrane wall thickness) is utilized for evaporation of aqueous solutions, the heated solution to be concentrated is placed on one side of the membrane, while cold water is placed on the other side. By means of the vapor difference, water travels as a gas from the hot to the cold side of the membrane. The temperature stability, the low surface tension of the PVDF, which hinders a penetration of aqueous solution, and the oxidative resistance necessary with cleaning cycles are advantageously utilized.

Polymer hollow membranes with anisotropic structure, with which the pore size decreases from the inside towards the outside, can abriate, and the use of a pre-filter during the microfiltration. Such a pre-filtration is frequently employed in order to capture large particles which lead to an incrustation on the membrane and therewith a rapid drop in flow. These large particles are however, retained in the anisotropic membrane structure in the large interior pores without thereby reducing the filtering surface. The so-called "dirt capacity" of the anisotropic polymer membrane is thus correspondingly greater than in the case of isotropic structures.

Particularly suitable for performance of the method according to the present invention is an arrangement which is characterized by a nozzle for extruding a homogeneous, single-phase, liquid mixture downwardly and a cooling arrangement containing a cooling liquid with a substantially vertically arranged tubular zone surrounded by a wall (3), whi ch reaches from the entry point of the polymer/ mixing partner-mixture until at least the point of the start of solidification of the mixture, a guide arrangement beneath the point of the start of solidification and a discharge arrangement (6) for the shaped body and one or more openings for the inflow or outflow of the cooling liquid.

Preferably the cooling liquid is provided in the form of a U-tube, particularly an equal-sided U-tube. It is very expedient for the arrangement to possess inlet means for the cooling liquid with several symmetrically disposed openings. Preferably the arrangement possesses an overflow for the dosing of the cooling liquid.

It can also possess an overflow for the outflow of the cooling liquid.

The arrangement can be provided with an external thermostat.

According to a particularly advantageous embodiment of the invention an airspace is provided between nozzle and the level of the cooling liquid at the entry point of the polymer/mixing partner-mixture.

According to further particularly advantageous embodiment, the apparatus of the invention is provided in the form of a box-shaped installation with sight shield.

It is possible with the arrangement according to the present invention to selectively adjust the level of the cooling liquid, particularly with the use of overflow vessels, at the point of entry of the mixture, at the exit point of the shaped body, or simultaneously at entry and exit points.

The embodiment according to the present invention of the arrangement for performance of the method wherein the cooling arrangement is provided with a sight shield is therefore particularly advantageous since one can very precisely observe the point of the start of solification with such an arrangement. This is quite important at the start of production of the shaped body. Since the guiding arrangement must be placed beneath the point of the start of solidification, it is advantageous to be able to precisely observe this solidification point so that the guiding arrangement can be arranged appropriately.

It is also very favorable to work with such an arrangement if one wishes to alter method parameters so that the solidification point can be shifted subject to method parameters. The sight shield is a valuable aid with the technique of "stringing up" in which the formed shaped body must initially be withdrawn from the cooling liquid in order to bring it to the offtake arrangement.

The novel features which are considered as characterstic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
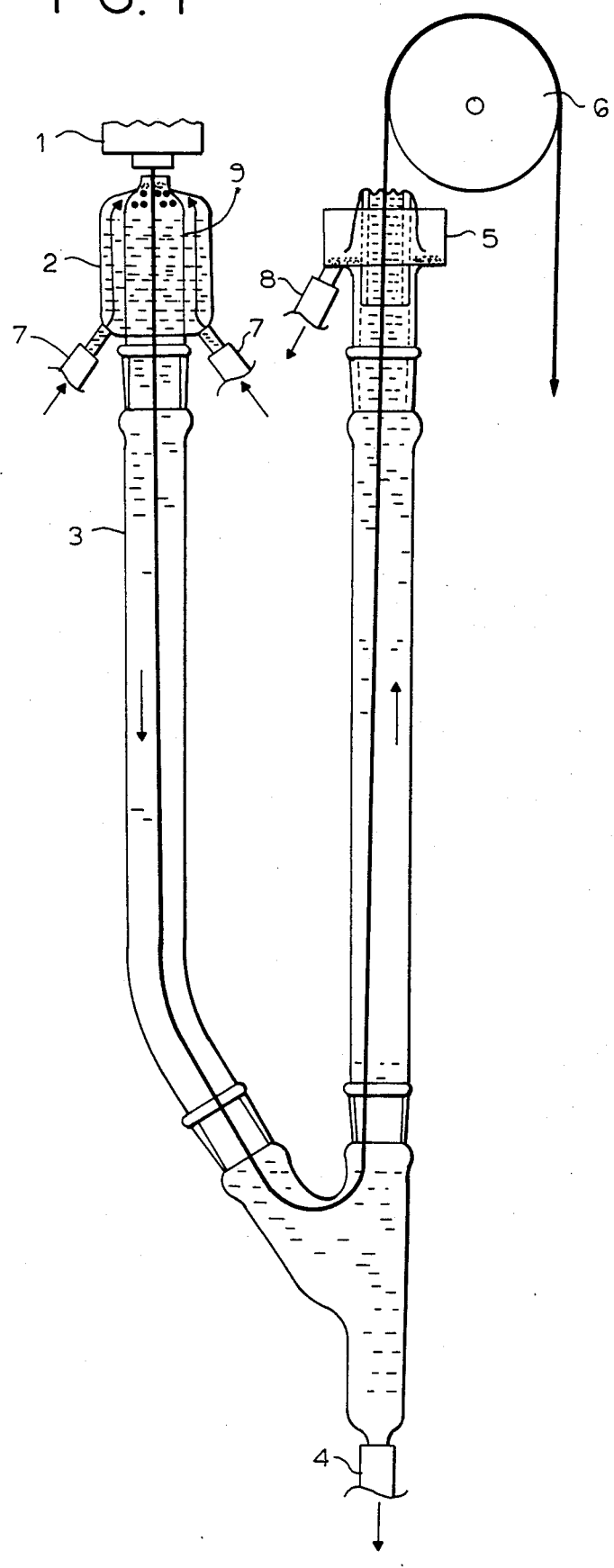
FIG. 1 is a schematic representation in front view of the apparatus suitable for performance of the method according to the present invention provided with a U-shaped tube.
Figure 2:
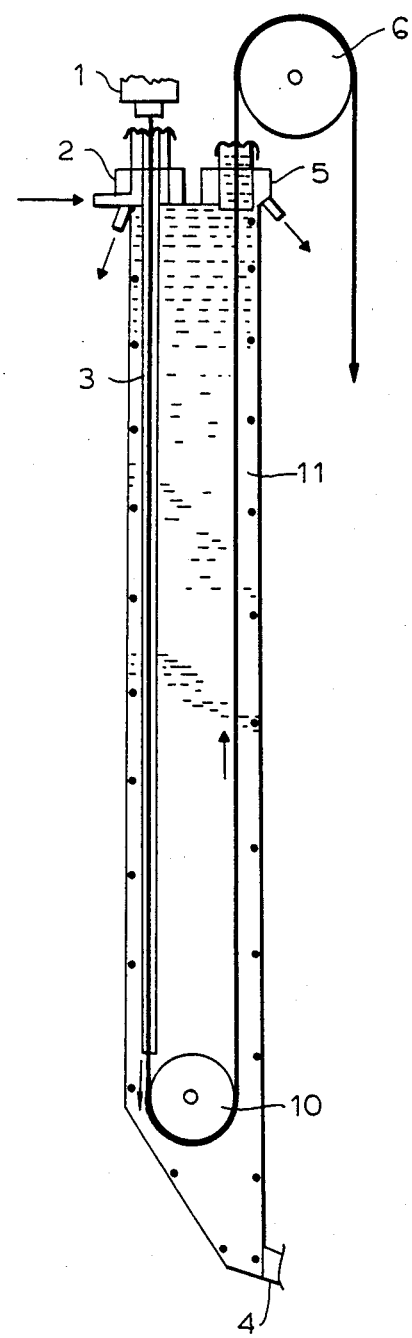
FIG. 2 is a further embodiment of the apparatus suitable for performance of the method according to the present invention, however without the U-shaped tube.

It is a preferred embodiment to provide a cooling arrangement composed of a U-shaped bent tube such as set forth in FIG. 1. However, one can also employ an embodiment as represented in FIG. 2. FIG. 1 shows a U-shaped bent arrangement with the following components:

1. nozzle
2. cooling liquid dosing and temperature attachment
3. stablization zone for the hollow fiber
4. outlet for the cooling liquid (for purposes of cleaning)
5. overflow cup with level regulating means for the cooling liquid
6. offtake wheel
7. cooling liquid supplyfrom thermostat
8. cooling liquid discharge to thermostat
9. symmetrically disposed holes for the dosing of cooling liquid In order to provide a good possibility for observation during the method, the U-tube is constructed in glass in most cases.

The tube, which is composed essentially of five parts, has a diameter of about 4 cm with a leg length of about 1 m.

(a) Cooling Liquid Dosing and Temperature Attachment

In order to be able to equalize the temperature change caused by supply of polymer/mixing partner-mixture as quickly as possible, according to this embodiment the point of entry for the cooling liquid is located close to the point of entry for the mixture. The temperature jacket assists with this function. Simultaneously this outer jacket and the dosing openings at the upper end of the tube provide for a distribution of the cooling liquid stream and allow an as careful as possible treatment of the here still unstable polymer mixture. The entry opening of the cooling tube, displaying about 5 $cm^2$ surface guarantees on the one hand sufficiently great latitude for thin and thick hollow fibers or tubes, and, on the other hand, reduces a greater surface instability of the cooling bath.

(b) Intake Leg of the U-tube (first zone)

In this range the polymer/mixing partner-mixture, which for example is supposed to be worked up into a porous hollow fiber, experiences upon cooling down the stage of demixing into two liquid phases and the solidification. Depending upon composition, nozzle temperature and cooling conditions, the start of solidification, respectively the stabilization, can be observed in the first of second third of the tube. This can be recognized when the originally transparent fiber becomes increasingly milky, and from the place of the start of solidification continues toward a determined final turbidity.

(c) Guiding the Shaped Body

The stabilized shaped body can be guided without becoming deformed in any way. In contrast to other embodiments of the cooling arrangement, here no guiding wheel, respectively no roller is installed. The downwardly directed tube continuation provided after the first zone permits a favorable handling during spinning. The sinking shaped body, e.g. hollow fiber, is collected here and can be drawn out as a thread from the discharge leg and led to the off take wheel.

(d) Discharge Leg

The apparatus is provided in metal. The middle part, of adjustable height, determines the overflow height of the cooling medium and thereby also the normally same level height of the cooling liquid below the spinning nozzle. Thus in simple manner an air gap can be adjusted between nozzle and cooling liquid. Components of the embodiment of the arrangement set forth in FIG. 2 are as follows:

1. nozzle 2. cooling liquid dosing with inflow cup and overflow collecting body
3. cooling tube (transparent)
4. outlet for cooling liquid (for purposes of cleaning)
5. overflow arrangement with level regulation (adjustable: same level as inlet or slight level difference)
6. off take wheel
10. guide roller
11. cooling tank with sight shield Invention is more closely illustrated by the following examples:

EXAMPLE 1

In a hollow fiber spinning apparatus with continuously operating solution preparation part, a mixture is prepared composed of 14 parts AKULON 6 (polyamide 6-FA. AKZO-Plastics bv) with a relative solution viscosity of 4.7 (measured in formic acid) and 86 parts of a solvent mixture composed of about 75% glycerin (less than 0.05% water) and about 25% ethyleneglycol (less than 0.05% water) with addition of 0.25% of thickening agent Carbopol (Goodrich), relative to the solvent, which is then immediately spun. In order to guarantee as low as possible a degradation of the polymer, the apparatus was laid out such that brief dwell times (about 10 minutes from the start of solution production) could be guaranteed with as gentle as possible temperature conditions.

For preparation of the solution, the polymer granulates (less than 0.02% water) are melted by means of extruder at about 280° C. and introduced by means of gear wheel pump to the mixing chamber heated to about 180° C. The mixer, running at about 170 rpm, provides for formation of a homogeneous, average viscosity, clear solution from the dosed solvent mixture, likewise at a temperature of about 180° C, with the polymer melt. Solution is filtered before deformation into the hollow fibers. The hollow fiber nozzle is heated to a temperature between 150 and 155° C. A mixture of glycerin/PEG 300 (1 : 1) serves as lumen-filling medium. After passing an airgap of about 0.5 cm, the fiber enters into the 2 meter long U-shaped glass tube, coated with 50° C warm water, as represented in FIG. 1. After entry into the cooling medium, the fiber sinks slowly into the lower part of the tube, and is withdrawn by means of a thread from the discharge leg and then led to the offtake wheel. The nozzle exit velocity of the polyamide solution amounts to about 15 m/min, the average cooling bath velocity about 1 m/min.

It can clearly be observed how the thin liquid to medium viscosity polymer solution becomes milky after a short dwell period in the water at the start of phase separation, and finally upon solidification becomes stabilized to such an extent that it can be guided without deformation and can be continuosly discharged at a velocity of 20 m/min. After extraction of the solvent and the thickening agent with 60° C. warm water, and a subsequent rinsing with 50° C. warm acetone, the fibers can be dried at 50° C.

Characteristics of the obtained hollow fiber membrane:
Outer diameter : 1.0 mm
Inner lumen : 0.55 mm
Maximum pore size : 1.40 μm
Flow (water) in 1/m²/h at 1.0 bar :17,600
Solution viscosity : 4.65

Shrinkage (length) through extraction and drying : 8%

For measurement of the maximum pore size, the hollow fibers are immersed in ethanol and coated on the inside with nitrogen. The pressure at which the ethanol at the walls of the hollow fibers is penetrated by nitrogen and at which the first gas bubbles are recognized at the outside is measured.

The maximum pore size is calculated from the determined value ("bubble point")

$$d_{max} = \frac{0.635}{P_{max} \text{ (bubble point) bar}} = \mu m$$

wherein $d_{max}$=maximum pore diameter in μm, $P_{max}$ is the measured pressure in bars at the first breakthrough.
Example:

$$d_{max} = \frac{0.635}{0.62 \text{ bar}} = 1.02 \mu m$$

In order to determine the transmembrane water flow, the hollow fibers are coated on the inside with completely desalted water and the flow through amount through the membranes is measured at 1.0 bar.

Microscopic examination reveals pore structure with openings on both the interior and the outer walls.

A sample of the polymer solution coming from the nozzle is collected in a temperature-controlled glass vessel. With stirring, the temperature of the solution is lowered and a solidification temperature of about 150° C. is determined.

EXAMPLE 2

Analogous to a discontinuous manner of operation for production of the solution, the polymer is dissolved directly into the solvent mixture at temperatures lying clearly below the softening point of the polyamide, and employed according to the following principle continuously in a technique more conserving with respect to the polymer.

The polymer is pre-mixed in pulverized form into the solvent mixture (including thickening agent) and introduced by means of a lifting cylinder pump into a doubleneck extruder wherein it is dissolved at about 160°–170° C. After a brief dwell period, the homogeneous polymer mixture is introduced to the hollow fiber nozzle and then spun at about 145° C. as in Example 1.

Composition of the mixture is:
15% Perlon LV 3.67 (Fa. Enka)<0.02% water
85% ethyleneglycol/glycerin 1:1 <0.05% water with an addition of 0.3% thickening agent Carbopol 934

Glycerin serves for formation of the interior lumen. The formed hollow filament is led through the U-shaped cooling tube in the manner described in Example 1. After extraction of the solvent and thickening agent, and subsequent drying, the porous hollow fibers membranes are tested.

Test values:
Hollow fiber diameter: 1.2 mm
Interior lumen: 0.6 mm
Maximum pore size: 0.6 mm
Transmembrane flow: 5,600 1/m²/h (water) at 1.0 bar In this operational example ethylene glycol functions as solvent and glycerin as non-solvent respectively swelling agent with following temperature adjustments:

|  | Solution temp. | Solidification temp |
|---|---|---|
| 15% Perlon LV 3.67 + 85% ethyleneglycol | ca. 145° C. | ca. 130° C. |
| 15% Perlon LV 3.67 + 42.5% ethyleneglycol 42.5% glycerin | ca. 160° C. | ca. 143° C. |
| 15% Perlon LV 3.67 + 85% glycerin | ca. 175° C. | ca. 156° C. |

EXAMPLE 3

In the apparatus described in Example 1, a mixture composed of about 15 parts AKULON 6 LV 4.7 and 85 parts of a solvent combination ethyleneglycol/polyglycol (molecular weight 1,500) in the ratio 87.5:12.5 and an addition amount of 0.3% Carbopol 934 at ca. 180° C. is made into a homogeneous solution and subsequently spun into hollow fibers. After extraction and drying in the described manner, porous hollow fibers are produced with open surfaces on all sides.

Parallel to this spinning, a mixture with the same composition is stirred into a heatable glass flask and slowly heated (about 2° C./min) with constant stirring under nitrogen atmosphere. One can clearly observe how the polymer granulates stirred into the solvent are initially swollen at about 140°–145° C., and become dissolved with rising temperature. A gel-like, cloudy mixture is produced, which form a homogeneous solution, clear and transparent, at above 175° C.

With slow cooling down of this mixture the start of phase separation with turbidity of the solution occurs at about 175° C. With decreasing temperature more and more of the polymer-rich phase separates from the polymer-poor phase until finally at about 138° C. the higher concentrated phase solidifies.

For this polymer mixture, ethyleneglycol serves as solvent and polyethyleneglycol 1500 as non-solvent. Depending upon the addition of non-solvent, the temperature can be varied at which the homogeneous solution forms, varying thereby the span from formation of the two phases up until solidification, which can lead to different pore formations.

EXAMPLE 4

In a heatable glass flange flask, 17.5% Perlon LV 3.67 and 82.5% of a mixture composed of 45 parts Caprolactam and 55 parts polyethylene glycol 300 (M weight) are dissolved at about 200° C. A homogeneous, thinly viscous and clear solution is quickly obtained under nitrogen atmosphere and with constant stirring. This preparation could be worked up in the previously described hollow fiber spinning arrangement. At a nozzle temperature of about 210° C., the hollow fibers are formed. Polyethyleneglycol 300 serves as lumen-filling medium. Water at a temperature of 45° C. is employed as cooling bath in the U-shaped cooling tube.

The solidified fibers are extracted in customary manner and then dried. Microscopic examination reveals a very uniform pore structure across the membrane cross-section, with openings on both outer and inner surfaces.
Test values:
Outer diameter: 1.2 mm
Interior lumen: 0.85 mm
Maximum pore size: 0.29 μm
Transmembrane flow: 0.31 ml/cm$^2$/Min 0.1 bar (isopropanol)

The transmembrane flow is determined with isopropanol.

In a manner analogous to the previous measurement with water, the hollow fibers are coated on the inside with isopropanol (35° C.) and the amount flowing through the membrane is measured at 0.1 bar.

EXAMPLE 5

A mixture of 20 parts by weight polyvinylidenefluoride-PVDF (Solef 1012, LV=2.68 measured in dimethylformamide) (Fa. Solvay, Belgien) and 80 parts by weight of a solvent mixture composed of 37.5% glycerintriacetate (dissolver) and 62.5% Witamol 320 (non-dissolver-dioctyladipate-Fa. Dynamit Nobel) is provided in a heatable glass vessel. Under intensive stirring and in a nitrogen atmosphere, the polymer granulates and the solvent mixture are brought to a temperature of about 215° C. At about 145° C., the granulates are swollen, and with increasing temperature a homogeneous low viscous solution forms.

Part of the so prepared solution is extruded at about 220° C. through a hollow fiber nozzle of a spinning machine into the U-shaped tube represented in FIG. 1 at a velocity of 15 m/min. Distilled glycerin is employed as interior filler for formation of the fiber lumens. After passing an airgap of about 1 cm, the fibers enter the approximately 2 m long U-shaped glass tube which is coated with water of about 25° C. After entry into the cooling medium the fibers slowly sink into the bottom part of the tube and are discharged from the outflow leg and led to an offtake wheel. During the process the water flows with an average velocity of 1 m/min in the same direction of the polymer mixture in the arrangement. It is clearly observable how the thin liquid polymer solution becomes milky at the start of phase separation after a brief dwell period in the water, and finally becomes stabilized upon solidification, so that it is guided without deformation and can be discharged continuously with a velocity of 20 m/min.

After extraction of the liquid component by means of 50° C. warm isopropanol, the fibers are dried in a vacuum at about 50° C.

Characteristics of the obtained hollow fiber membrane:
Outer diameter: 1.24 mm
Interior lumen: 0.88 mm
Maximum pore size: 0.58 μm
Transmembrane flow (isopropanol) in ml/cm$^2$. min at 0.1 bar: 0.95

In order to measure the maximum pore size, the hollow fibers are immersed in ethanol and then coated from the insides with nitrogen. What is measured is the pressure at which the ethanol on the walls of the hollow fibers is penetrated by nitrogen and the first gas bubbles are recognized on the outside.

From the determined value ("bubble point") can be determined the maximum pore size $$d_{max.} = \frac{0.635}{P_{max.}} \mu m$$

wherein $d_{max}$=maximum pore diameter, $P_{max}$=bubble point (bar).

In order to determine the isopropanol flow, the hollow fibers are coated on the inside with 35° C. isopropanol, and the flowthrough amount is measured at 0.1 bar.

Microscopic examination reveals pore structures with openings on both interior and outer walls. The result is a structure displaying substantially sphere-shaped pores.

EXAMPLE 6

30 parts by weight PVDF (Solef 1012) and 70 parts 2-(2-butoxy-ethoxy-) ethylacetate at a temperature of about 155°–160° C. are converted into a homogeneous solution of average viscosity. At about 120°–130° C. the start of swelling of the granulates is observed.

The PVDF-solution, solidification temperature of which amounts to about 110° C., is spun in a manner analogous to that described in Example 1 at about 150° C. and then cooled in a bath of glycerin/water (1:1) of temperature 35° C. The extracted and dried hollow fibers have the following characteristic data:

Outer diameter: 1.20 mm
Interior volume: 0.80 mm
Maximum pore size: 0.94 $\mu$m
Transmembrane flow (isopropanol) at 0.1 bar in ml/cm$^2$.min :0.57

A pore system results which is composed substantially of a 3-dimensional network of pores, separated only by narrow intermediate bridges.

While the invention has been described as illustrated and embodied in porous shaped bodies, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for the production of a porous shaped body comprising the steps of:
    (a) extruding a homogeneous signal phase liquid mixture of at least one meltable organic polymer and at least one inert mixing partner, liquid at the temperature of preparation of said mixture, and wherein at least one liquid mixing partner is a solvent for the meltable organic polymer at the temperature of the preparation of the mixture, said mixture displaying in a liquid state and above room temperature a range of complete miscibility, a range with a miscibility gap, and a solidification range, at a temperature above said miscibility gap;
    (b) leading said extruded mixture at an average linear velocity $V_1$ from its entry point into a cooling liquid having a temperature below the solidification point of said meltable organic polymer within said mixture, said cooling liquid dissolving said meltable organic polymer insubstantially or not at all at said temperature at least until said meltable organic polymer begins to solidify, initially through a substantially vertically arranged tubular first zone, surrounded by walls, and filled with said cooling liquid, wherein the average linear velocity $V_2$ of said cooling liquid to said substantially vertically arranged tubular first zone, measured in the direction of movement of said polymer-mixing partner mixture is at least 20% less than the velocity $V_1$ of the extruded mixture to minimize mechanical stress on said mixture to convert said homogeneous single phase mixture to two liquid phases occuring side-by-side as a result of separating in the liquid state a polymer-poor liquid phase of the mixing partner and a mixing partner-poor, polymer-enriched liquid phase, whereby upon further cooling the mixing partner-poor, polymer-enriched liquid phase forms a porous shaped body;
    (c) guiding said porous shaped body formed after the start of solidification of the meltable organic polymer and leading said porous shaped body upwardly through a second zone of said cooling liquid;
    (d) withdrawing the porous shaped body from said second zone of said cooling liquid; and
    (e) maintaining constant the level of said cooling liquid not only at the entry point but also at the exit point of said porous shaped body from said cooling liquid.

2. The method according to claim 1, further comprising after withdrawing said porous shaped body from said cooling liquid washing until all components aside from said polymer are completely or nearly completely removed, and then drying.

3. The method according to claim 1, wherein said cooling liquid is led through said substantially vertically arranged tubular first zone with an average linear velocity $v_2$ at least about 25% less than $v_1$.

4. The method according to claim 1, wherein said average linear velocity $v_2$ of said cooling liquid substantially equals 0.

5. The method according to claim 1, wherein a liquid reflecting surface of said cooling liquid at an exit point for said porous shaped body is maintained at the same level as at an entry point of said polymer/mixing partner-mixture into said cooling liquid.

6. The method according to claim 1, wherein said cooling liquid comprises a cooling liquid bath situated in a U-shaped curved tube.

7. The method according to claim 1, further comprising continuously dosing supplementary cooling liquid into said cooling liquid close to said entry point of said mixture into said cooling liquid so that it flows parallel with a direction of movement of said mixture and then leaves said cooling arrangement means at an exit point of said porous shaped body from said cooling liquid.

8. The method according to claim 1, wherein said cooling liquid is supplied through a plurality of openings arranged about an entry point of said mixture into said cooling liquid.

9. The method according to claim 8, wherein said cooling liquid is supplied through openings symmetrically disposed about said entry point of said mixture.

10. The method according to claim 7, wherein said cooling liquid is dosed in the form of a coherent film around an entry point of said mixture into said cooling liquid.

11. The method according to claim 1, wherein said step of extruding is effected over an airgap defined between said nozzle and said entry point of said polymer/mixing partner-mixture into said cooling liquid.

12. The method according to claim 11, wherein said air-gap has a length between 2 and 20 mm.

13. The method defined in claim 11, wherein the temperature and humidity of the airgap are maintained constant.

14. The method according to claim 1, wherein said cooling liquid possesses at said entry point of said mixture into said cooling liquid a specific weight up to 20% lower than said mixture at this place.

15. The method according to claim 1, comprising extruding a polymer/mixing partner-mixture having a viscosity between 2 and 25 Pa s.

16. The method according to claim 1, comprising extruding a polymer/mixing partner-mixture containing 10 to 90% by weight polymer.

17. The method according to claim 1, comprising extruding a polymer/mixing partner-mixture containing 10 to 25% by weight polymer.

18. The method according to claim 1, wherein said polymer/mixing partner-mixture is deformed into a membrane in the shape of a hollow fiber, tubing or foil.

19. The method according to claim 18, for the production of hollow fibers or tubing, wherein a lumen inside said porous shaped body is formed by means of introducing a liquid, said liquid constituting at the temperature of forming said lumen a non-solvent for said polymer.

20. The method according to claim 19, wherein said liquid comprises glycerin or a liquid employed as mixing partner for preparation of said mixture.

21. The method according to claim 18, for the production of hollow fibers or tubing, further comprising providing a lumen inside said porous shaped body by means of introducing gaseous nitrogen through an interior of said porous shaped body.

22. The method according to claim 1, wherein the solidification temperature of said mixture lies above about 50° C.

23. The method according to claim 1, wherein water is employed as said cooling liquid, with or without addition of a surfactant.

24. The method according to claim 23, employing water as cooling liquid having a temperature between 20° and 80° C.

25. The method according to claim 1, wherein said mixture comprises in addition to at least one solvent at least one mixing partner which is a non-solvent for said polymer at temperature of production of said mixture and its extrusion through said nozzle.

26. The method according to claim 1, wherein Polyamide is employed as polymer.

27. The method according to claim 1, employing as polymer copolyamide based upon E-caprolactam and hexamethylenediamine/adipic acid salt.

28. The method according to claim 26, employing as mixing partner a mixture of ethyleneglycol and glycerin.

29. The method according to claim 1, employing as polymer polyvinylidene fluoride (PVDF).

30. The method according to claim 29, employing as solvent for production of said mixture at least one compound selected from the group consisting of glycerin triacetate, glycerin diacetate and 2-(2-butoxyethoxy)-ethylacetate.

31. The method according to claim 29, further comprising employment of di-n-octyladipate or castor oil or a mixture thereof as non-solvent for PVDF while producing said polymer/mixing partner-mixture.

32. The method according to claim 30, further comprising employing di-n-octyladipate or castor oil or a mixture thereof as non-solvent for PVDF while producing said polymer/mixing partner-mixture.

33. The method according to claim 1, wherein said mixture further comprises 0.05 up to 0.3% by weight of thickening means.

34. The method according to claim 1, wherein said cooling liquid is led through the substantially vertically arranged tubular first zone opposite to the direction of movement of the polymer/mixing partner mixture.

35. A porous shaped body produced according to the process defined in claim 15.

36. Porous shaped body produced according to the method of claim 29.

37. The porous shaped body according to claim 36, containing an anisotropic pore system.

38. A method of microfiltering a strongly acid or alkaline aqueous solution which comprises the step of passing said solution through a porous membrane prepared from the porous shaped body defined in claim 36.

39. A method of microfiltering an oxidizing solution medium which comprises the step of passing said solution through a porous membrane prepared from the porous shaped body defined in claim 36.

40. A method of microfiltering an aqueous hypochlorite solution which comprises the step of passing said solution through a porous membrane prepared from the porous shaped body defined in claim 36.

41. A method of carrying out transmembrane distillation which comprises the step of employing a porous membrane prepared from the porous shaped body defined in claim 36.

42. An extrusion apparatus for the production of a porous shaped body from a homogeneous single-phase liquid mixture which comprises:
  (a) a nozzle for extruding the homogeneous single-phase liquid mixture downardly;
  (b) cooling means, for containing a cooling liquid, said cooling means having a substantially vertically arranged tubular zone communicating with said nozzle and surrounded by wall means reaching from an entry point of said mixture downwardly until at least a point of commencing solidification of said mixture, said cooling means having directing means below a point of commencing solidification to upwardly guide the solidified mixture along a U-shaped path, as well as at least one opening for supply and exit of the cooling liquid; and
  (c) offtake means for said porous shaped body, said offtake means disposed separately from said cooling means at the end of said U-shaped path.

43. The apparatus according to claim 42, wherein said cooling means comprise a U-tube.

44. The apparatus according to claim 43, wherein said U-tube is an equal-leg U-tube.

45. The apparatus according to claim 42, comprising inlet means having a plurality of symmetrically disposed openings for said cooling liquid.

46. The apparatus according to claim 42, further comprising overflow means for dosing of said cooling liquid.

47. The apparatus according to claim 42, further comprising overflow means for runoff of said cooling liquid.

48. The apparatus according to claim 42, further comprising external thermostatization means.

49. The apparatus according to claim 42, wherein said nozzle and a level of cooling liquid at an entry point of said mixture are separated by an air gap.

50. The apparatus according to claim 42, wherein said cooling means are box-shaped and further comprise a sight opening.

* * * * *